United States Patent [19]

Park

[11] Patent Number: 5,351,223
[45] Date of Patent: Sep. 27, 1994

[54] TRACKING INDUCTION SYSTEM AND METHOD FOR OPTICAL DISC DRIVERS

[75] Inventor: Sung C. Park, Kyoungki-do, Rep. of Korea

[73] Assignee: Hyundai Electronics Industries Co., Ltd., Kyoungki-do, Rep. of Korea

[21] Appl. No.: 85,022

[22] Filed: Jun. 30, 1993

[30] Foreign Application Priority Data

Jul. 7, 1992 [KR] Rep. of Korea .................... 92 12089

[51] Int. Cl.$^5$ ........................................... G11B 7/085
[52] U.S. Cl. ........................ 369/44.28; 369/44.29; 369/44.34
[58] Field of Search ............... 369/32, 44.25, 44.28, 369/44.29, 44.32, 44.34–44.36, 54

[56] References Cited

U.S. PATENT DOCUMENTS

| | | | |
|---|---|---|---|
| 4,839,876 | 6/1989 | Fennema | 369/32 |
| 5,050,146 | 9/1991 | Richgels et al. | 369/44.28 X |
| 5,090,002 | 2/1992 | Chow et al. | 369/44.28 |
| 5,101,390 | 3/1992 | Kuwabara | 369/44.28 |
| 5,144,605 | 9/1992 | Kobayashi et al. | 369/44.28 X |

*Primary Examiner*—W. R. Young
*Attorney, Agent, or Firm*—Merchant, Gould, Smith, Edell, Welter & Schmidt

[57] ABSTRACT

A tracking induction system and method in which an artificial tracking induction signal is generated by selectively outputting one of a tracking error signal that is a well-known position error signal detected by a detector of an optical disc driver, a sum signal that is a signal phase-shifted 90° from the position error signal and provided by the detector, a tracking error enable signal, a $-V$ on signal and a $+V$ on signal, the latter three signals being provided by a microprocessor, according to a selective switching operation of a switching unit for each track interval, so that the artificial tracking induction signal is applied to a tracking servo circuit, thereby achieving a tracking induction to a target track, even at intervals of $\pm\frac{1}{2}$ track pitches or more from the target track. The tracking induction method includes three steps of shifting a laser beam to one track pitch before the target track, shifting the laser beam toward the target track while checking whether the laser beam is positioned within a range of $\pm\frac{1}{2}$ track pitches from the target track, and shifting the laser beam toward the target track while checking whether the laser beam is positioned with in a range of $\pm\frac{1}{4}$ track pitches from the target track.

4 Claims, 3 Drawing Sheets

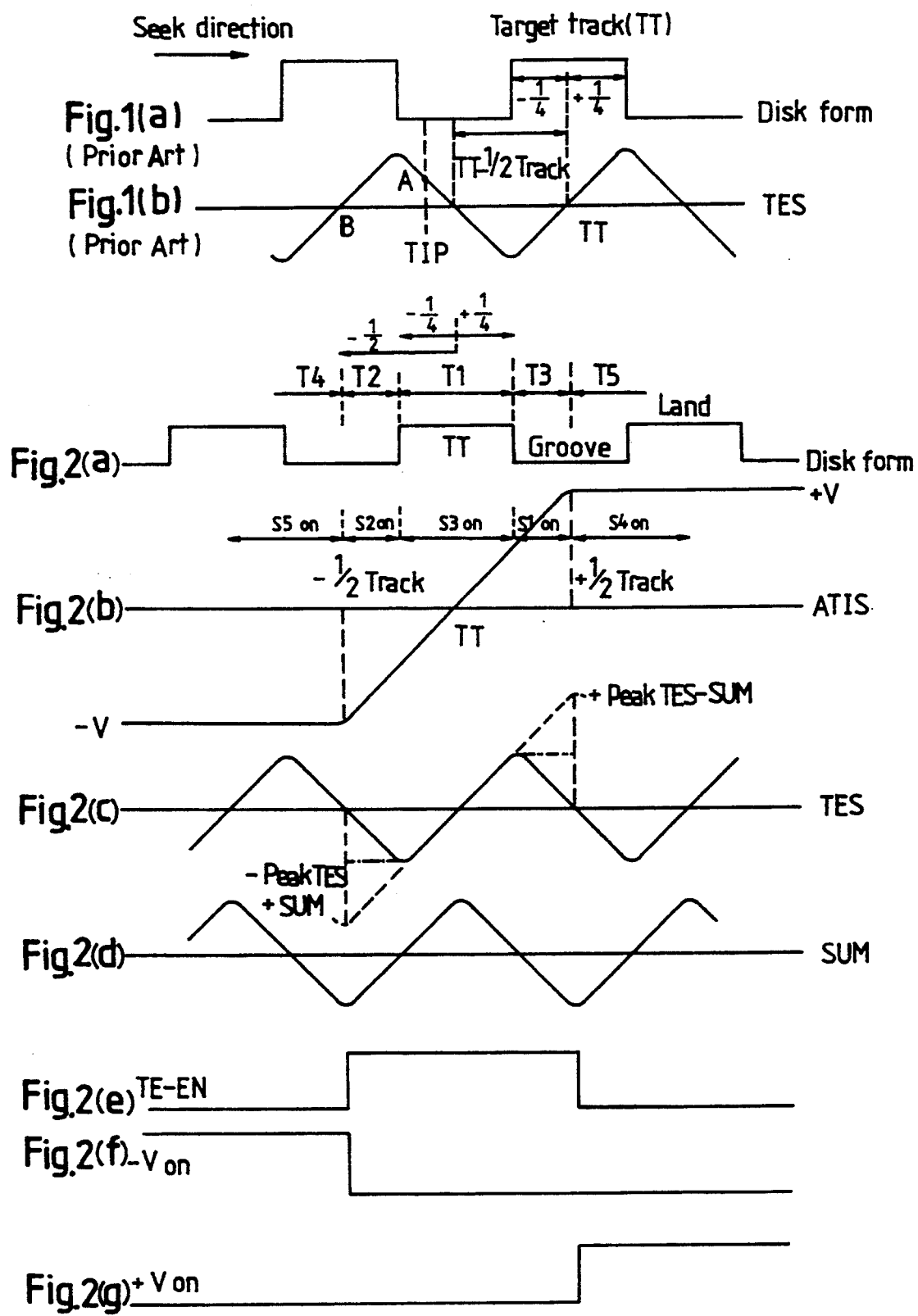

1

TRACKING INDUCTION SYSTEM AND METHOD FOR OPTICAL DISC DRIVERS

BACKGROUND OF THE INVENTION

1. Field of the Invention

The present invention relates to tracking induction system and method for optical disc drivers (ODDs), which are capable of seeking a tracking enable position after completing a seek operation for a target track, to perform a tracking operation at the target track, 2. Description of the Prior Art Generally, detection of data in ODDs is achieved by performing a track seek operation for seeking a desired track and then a tracking operation for making laser beam follow a target track, as disclosed in U.S. Pat. No. 5,090,002. For carrying out the tracking operation after completing the seeking operation, it is required to seek a position enabling the tracking operation. To this end, a tracking induction is carried out. The tracking induction is initiated by deriving a point of time when the tracking induction begins at ¼ track pitch position before a target track. When a position of laser beam is shifted from a desired position, namely, ¼ track pitch position before the target track, at the point of time when the tracking induction is carried out, due to a radial run-out of disc and a deflection of a spindle motor, a failure of the tracking induction may be caused. In particular, the shift by over ¼ track pitch makes it impossible to achieve the tracking induction.

General techniques for such a tracking induction are based on a principle illustrated in FIGS. 1a and 1b. The surface profile of an optical disc is of a structure having lands and grooves alternatingly arranged, as shown in FIG. 1a. One of the lands is predetermined as a target track TT, to carry out a track seek operation. When laser beam is approaching the target track TT, it is required to perform a tracking induction operation wherein the laser beam is positioned at the track center line of target track TT by accurately inducting the laser beam into the target track at a point of tracking induction time.

Here, the tracking induction operation means that the tracking operation which is shut off at a seek mode is initiated when the laser beam is recognized as reaching the target track TT.

Where the tracking induction point for initiating the tracking induction operation is positioned within ¼ track pitch from the target track TT, in particulate when it is positioned within ¼ track pitch before the target track TT, a tracking error signal TES which is generated by a detector for servo control of general ODDs exhibits a polarity of negative (−), as shown in FIG. 1b. As a result, the laser beam is shifted rightward so that it is positioned at the track centerline of target track TT. On the other hand, when the tracking induction point is positioned within ¼ track pitch behind the target track TT, the tracking error signal TES exhibits a polarity of positive (+), so that the laser beam is shifted leftward, so as to be positioned at the track center line of target track TT. Where the tracking induction point is positioned within a range of ¼ track pitch to ½ track pitch before the target track TT, the laser beam is shifted rightward, since the tracking error signal TES has the negative polarity. In this case, however, a positive feedback effect occurs, that the tracking error value increases as the laser beam is shifted. Due to such a positive feedback effect, the laser beam does not reach the target track TT, but jumps. Then, the operation for seeking the target track TT is carried out again. As a result, a long time is required for making the laser beam reach the target track TT, in that there is required the time taken to read information about the target track TT for checking whether the object track corresponds to the desired target track TT and the track jumping time, namely, the time taken to seek the target track TT. Where the tracking induction point TIP is the point A indicated in FIG. 1b, the laser beam is shifted leftward since the polarity of tracking error signal TES is positive, so that it can not reach the target track TT, but moves to the point B. In some cases, the laser beam may be positioned at one track pitch before the target track TT.

SUMMARY OF THE INVENTION

Therefore, the present invention has been made in view of the above-mentioned problems encountered in the prior art and thus an object of the invention is to provide tracking induction system and method capable of performing a tracking induction irrespective of the position of laser beam and thus making the tracking induction stable.

In accordance with this object, the present invention provides a tracking induction system in which an artificial tracking induction signal is generated by selectively outputting one of a tracking error signal that is a well-known position error signal detected by a detector of an ODD, a sum signal that is a signal phase-shifted 90° from the position error signal and provided by the detector, a tracking error enable signal, a −V on signal and a +V on signal, the latter three signals being provided by a microprocessor, for each track interval, so that the artificial tracking induction signal is applied to a tracking servo circuit, thereby achieving a tracking induction to a target track, without any error.

In accordance with the present invention, the tracking induction system comprises: peak detection means for detecting positive and negative peak values of a tracking error signal that is a position error signal from a detector of an optical disc driver for sensing a laser beam reflected by a disc; a gain controller for controlling the gain of a sum signal with a phase shift of 90° from said position error signal, to be the same as said tracking error signal; switching circuit means having first to three output stages and for switching a tracking error enable signal, the tracking error signal and the sum signal all supplied from a microprocessor when the laser beam is approaching a target track; a deductor and an adder for performing a deduction and an addition for outputs from said peak detection means and said gain controller, respectively; logic circuit means for controlling the switching of the tracking error signal, based on not only −V on signal and +V on signal outputted orderly from said microprocessor at intervals of ±½ track pitches from said target track and adapted to switch −V and +V, but also a signal from said third output stage of said switching circuit means; and a switching unit for selecting one from a group consisting of outputs from the deductor and adder, the tracking error signal, the +V and the −V, at each interval, based on the tracking error signal, the sum signal, the tracking error enable signal, the −V on signal and the +V on signal, and thus generating an artificial tracking induction signal enabling a tracking induction at intervals of ±½ track pitches or more from said target track.

The present invention also provides a tracking induction method comprising: a first step of shifting a laser beam to one track pitch before a target track; a second main step of checking, when the laser beam after the first step is positioned beyond a range of $\pm \frac{1}{4}$ track pitches from the target track, whether a track pitch of the shifted laser beam from the target track is less than $-\frac{1}{2}$ track pitch, shifting the laser beam to the target track, based on a $-V$ on signal, when the track pitch of the laser beam is less than $-\frac{1}{2}$ track pitch, shifting the laser beam to the target track, based on a $+V$ on signal, when the track pitch is more than $+\frac{1}{2}$ track pitch, and performing a subsequent step, based on a tracking error enable signal, when the track pitch of the laser beam is within a range of $\pm \frac{1}{2}$ track pitches; and a third step of performing an automatic tracking operation, based on a tracking error signal, when the shifted laser beam after said second main step is positioned within a range of $\pm \frac{1}{4}$ track pitches from the target track and shifting the laser beam to the target track, based on a signal resulting from a deduction or an addition for a positive or negative peak value of the tracking error signal and a sum signal, when the laser beam is positioned beyond said range of $\pm \frac{1}{4}$ track pitches,

BRIEF DESCRIPTION OF THE DRAWINGS

These and other objects, features and advantages of the invention will become more apparent upon a reading of the following detailed specification and drawings, in which:

FIGS. 1a and 1b illustrate a relation between a tracking induction point and a tracking error, in accordance with the prior art, wherein FIG. 1a is a schematic view of the surface profile of a disc and FIG. 1b is a waveform diagram of a tracking error signal detected by a detector;

FIGS. 2a to 2g illustrate a tracking induction carried out, using an artificial tracking induction signal, in accordance with the present invention, wherein FIG. 2a is a schematic view of the surface profile of a disc, FIG. 2b is a waveform diagram of the artificial tracking induction signal, FIG. 2c is a waveform diagram of a tracking error signal detected by a detector, FIG. 2d is a timing diagram of a sum signal generated by the detector, and FIGS. 2e to 2g are timing diagrams of a tracking error enable signal TE-EN, $-V$ on signal and $+V$ on signal newly generated by a microprocessor, respectively.

DETAILED DESCRIPTION OF THE PREFERRED EMBODIMENTS

Referring to FIGS. 2a to 2g, there is illustrated a case in which a tracking induction is carried out, using an artificial tracking induction signal ATIS. FIG. 2a is a schematic view illustrating the shape of a disc. FIG. 2b is a waveform diagram of the artificial tracking induction signal ATIS according to the present invention. FIG. 2c is a waveform diagram of a tracking error signal TES detected at the centerlines of lands and grooves by a detector as being at a zero crossing state. FIG. 2d is a timing diagram of a sum signal generated by the detector when the tracking error signal TES as a position error signal is phase-shifted 90°.

On the other hand, FIGS. 2e to 2g are timing diagrams of a tracking error enable signal TE-EN, $-V$ on signal and $+V$ on signal newly generated by a microprocessor, respectively, for realizing the present invention.

As apparent from the above timing diagrams, an accurate target track seek can be achieved even when a tracking induction is carried out at a point shifted by $\frac{1}{2}$ track pitch from a target track TT, by discriminating the position of laser beam at the tracking induction point according to the tracking error signal TES and the sum signal SUM and using the artificial tracking induction signal ATIS which is obtained for driving a fine actuator, based on the discriminated position of laser beam.

That is, the tracking induction is performed by using $-V$ signal at an interval of over $-\frac{1}{2}$ track pitch from the target track TT, the artificial tracking error signal at an interval of $\pm \frac{1}{2}$ track pitches from the target track TT, and $+V$ signal at an interval of over $+\frac{1}{2}$ track pitch from the target track TT.

Figure 3:
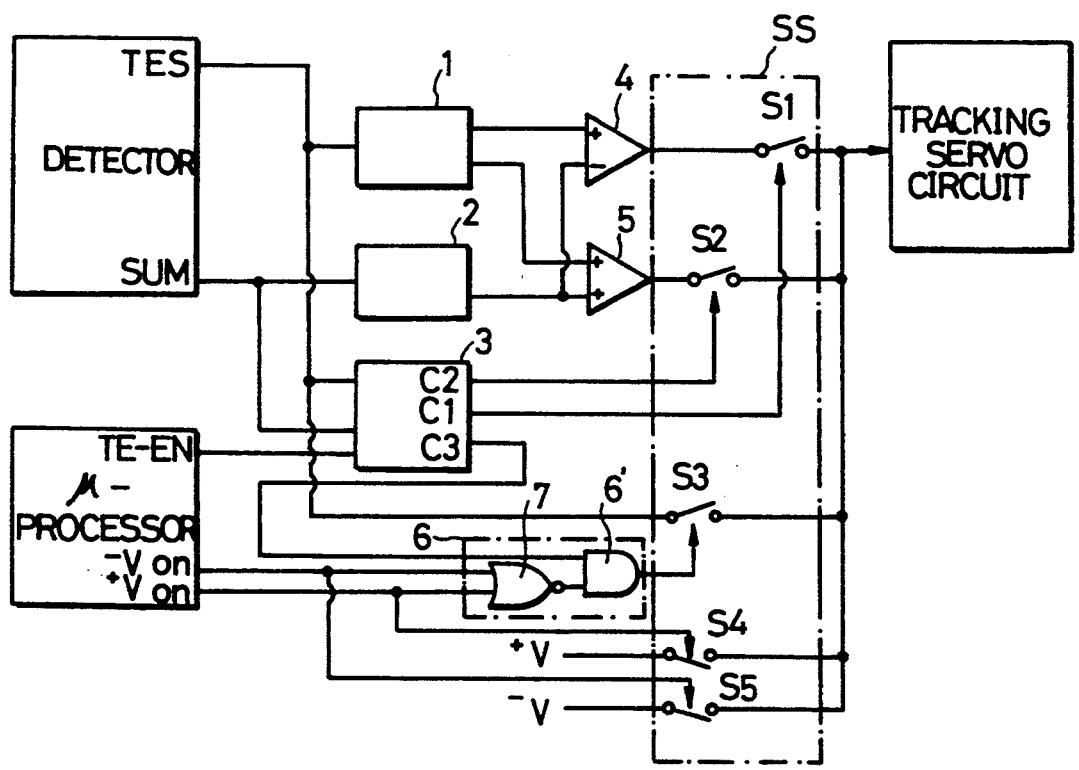
FIG. 3 is a block diagram of a tracking induction system according to the present invention.

FIG. 3 is a block diagram of a tracking induction system according to the present invention. In the system, a position error signal PES and a position error signal with a phase shift of 90° both detected by a detector equipped in a general ODD are used as a tracking error signal TES and a sum signal SUM, in accordance with the present invention. In accordance with the present invention, the detector is connected in parallel with the system and has terminals for outputting the tracking error signal TES and the sum signal SUM, respectively. Hereinafter, these signals utilized in the present invention are designated by "TES" and "SUM", respectively, so as to be distinguished from those of the existing circuit.

In accordance with the present invention, a microprocessor is provided for generating a tracking enabling signal TE-EN, $+V$ on signal and $-V$ on signal.

The system according to the present invention comprises a peak detection circuit 1 for receiving the tracking error signal TES and outputting positive and negative peak values thereof and a gain controller 2 for receiving the sum signal SUM and outputting a signal resulting from a gain control for making the amplitude of the sum signal SUM correspond to that of the tracking error signal TES. As a first operator, a deductor 4 is provided for receiving both an output from the peak detection circuit 1 indicative of the positive peak value of tracking error signal TES and an output from the gain controller 2 and outputting a signal resulting from a deduction operation therefor. As a second operator, an adder 5 is also provided for receiving an output from the peak detection circuit 1 indicative of the negative peak value of tracking error signal TES and the output from the gain controller 2 and outputting a signal resulting from an addition operation therefor. The system also comprises a first switch S1 and a second switch S2 for switching an output from the deductor 4 and an output from the adder 5, respectively, a switching circuit 3 for receiving the tracking error signal TES, the sum signal SUM and the tracking error enable signal TE-EN and controlling ON/OFF of the first and second switches S1 and S2, based on the received signals, a third switch S3 for switching inputting of the tracking error signal TE-EN at a tracking servo circuit. There is also provided a logic circuit 6 for receiving the $-V$ on signal, the +V on signal and a control signal C3 resulting from the switching operation of the switching circuit 3 and controlling ON/OFF of the third switch S3 connected to the tracking error signal TE-EN, based on the received signals. The system also comprises a fourth switch S4 and a fifth switch S5 for controlling outputting of the +V and −V levels, based on the +V on signal and −V on signal, respectively.

The logic circuit 6 comprises a NOR gate 7 adapted to receive the −V on signal and the +V on signal and an AND gate 6' adapted to receive both an output from the NOR gate 7 and an output from, an output stage C3 of the switching circuit 3 and control ON/OFF of the third switch S3, based on the received signals.

The switches S1 to S5 constitute a switching unit SS. A switching output selected by each switch of the switching unit SS is applied to the tracking servo circuit.

The operation of the system with the above-mentioned arrangement will now be described by intervals, in conjunction with FIGS. 2a to 2g.

Where a tracking induction is performed at an interval TI of ±¼ track pitches from a target track TT, shown in FIG. 2a, output stages C1 and C2 of the switching circuit 3 become low, because the level of sum signal SUM is high, as will be described in conjunction with FIG. 4. Accordingly, the first and second switch S1 and S2 are switched OFF. At this time, the output stage C3 of switching circuit 3 is maintained at its high state, because the level of tracking error enable signal TE-EN is high. This will be also described in conjunction with FIG. 4. The microprocessor determines whether laser beam has been positioned at the target track TT, by counting the number of track crossings of the disc. When the microprocessor determines that the laser beam has been positioned at the target track TT, it outputs the +V on signal and the −V on signal in low level, so that only the third switch S3 is switched ON. As a result, the tracking operation is continuously carried out, according to an artificial tracking induction signal ATIS shown in FIG. 2b.

Where the tracking induction is performed at an interval T2, the output stage C3 of switching circuit 3 becomes low, in that the level of sum signal SUM is decreased (it is negative at the interval T2), as will be described in conjunction with FIG. 4. At this time, the polarity of tracking error signal TES is negative, so that the output stage C2 of switching circuit 3 becomes high, thereby causing the second switch S2 to be switched ON. Since the output stage C3 of switching circuit 3 is low, the third switch S3 is switched OFF, as will be described in conjunction with FIG. 4. Accordingly, the negative peak value of tracking error signal TES, which is indicated by the single-dotted line in FIG. 2c, is added with the sum signal SUM in the adder 5 which, in turn, sends the resultant signal, which is indicated by the dotted line in FIG. 2c at the interval T2, to the tracking servo circuit via the second switch S2. On the other hand, opposite operations to those at the interval T2 is performed at an interval T3. That is, the output stages C1 and C2 become high and low, respectively. As a result, the first and second switches S1 and S2 are switched ON and OFF, respectively. Accordingly, the positive peak value of tracking error signal TES, which is indicated by the double-dotted line in FIG. 2c, is deducted by the sum signal SUM in the deductor 4 which, in turn, sends the resultant signal, which is indicated by the dotted line in FIG. 2c at the interval T3, to the tracking servo circuit via the first switch S1. Thus, at the intervals T2 and T3, the addition and deduction of the peak value of tracking error signal TES and the sum signal SUM are carried out, for generating desired artificial tracking induction signals ATIS shown in FIG. 2b, respectively. The artificial tracking induction signals ATIS for the intervals T2 and T3 are then sent to the tracking servo circuit, by the functions of the second and first switches S2 and S1, respectively. In these cases, the sum signal SUN passes through the gain controller 2, prior to the application to the deductor 4 or the adder 5 so that its gain corresponds to the gain of tracking error signal TES.

When the tracking induction is carried out at an interval T4, the switching circuit 3 maintains a low state at its output stages C1 and C2 and a high state at its output stage C3, because the tracking error enable signal TE-EN applied thereto becomes low in level. At this time, the fifth switch S5 is switched ON, in that the −V on signal has a high level. Accordingly, the −V signal shown in FIG. 2b is applied to the tracking servo circuit, as shown in FIG. 3. On the other hand, the third switch S3 is switched OFF, because the logic circuit 6 receives the −V on signal of high level and the +V on signal of low level.

At an interval T5, the opposite operations to those at the interval T4 are performed. In this case, the fourth switch S4 is switched ON, so that the +V signal shown in FIG. 2b is applied to the tracking servo circuit, as shown in FIG. 3.

Thus, the tracking operation based on the artificial tracking induction signal ATIS can be also achieved for the intervals T4 and T5 of over ±½ track pitches from the target track TT. That is, the target track TT is sought by shifting the laser beam rightward when the signal ATIS is negative and by shifting the laser beam leftward when the signal ATIS is positive.

Figure 4:
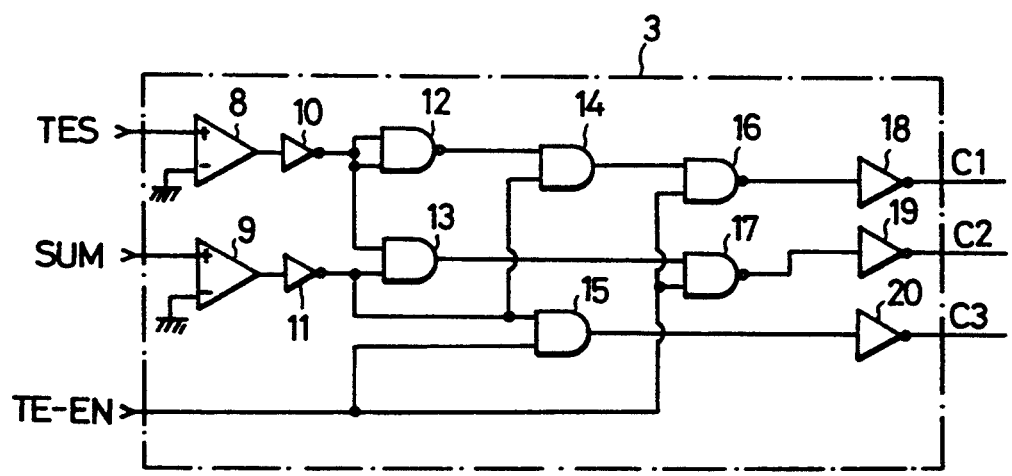
FIG. 4 is a circuit diagram of a switching circuit of the tracking induction system according to the present invention.

Referring to FIG. 4, there is illustrated a logic circuit diagram of the switching circuit shown in FIG. 3. As shown in FIG. 4, the switching circuit comprises a comparator 8 for receiving the tracking error signal TES and the ground at its inputs, an inverter 10 for inverting an output signal from the comparator 8, a NAND gate 12 for receiving an output signal from the inverter 10 at its common inputs and NANDing them, a comparator 9 for receiving the sum signal SUM and the ground at its inputs, an inverter 11 for inverting an output signal from the comparator 9, an AND gate 13 for receiving the output signal from the inverter 10 and an output signal from the inverter 11 at its inputs and ANDing them, an AND gate 14 for receiving an output signal from the NAND gate 12 and the output signal from the inverter 11 at its inputs and ANDing them, a NAND gate 16 for receiving an output signal from the AND gate 14 and the tracking error enable signal TE-EN at its inputs and NANDing them, an inverter 18 for inverting an output signal from the NAND gate 16 and outputting the resultant signal as a signal for controlling ON/OFF of the first switch S1, a NAND gate 17 for receiving an output signal from the AND gate 13 and the tracking error enable signal TE-EN at its inputs and NANDing them, an inverter 19 for inverting an output signal from the NAND gate 17 and outputting the resultant signal as a signal for controlling ON/OFF of the second switch S2, an AND gate 15 for receiving the output signal from the inverter 11 and the tracking error enable signal TE-EN and ANDing them, and an inverter 20 for inverting an output signal from the AND gate 15 and outputting the resultant signal as a signal for controlling ON/OFF of the third switch S3.

Now, operation of the switching circuit 3 with the above-mentioned arrangement will be described, in conjunction with FIGS. 2a to 2g.

The tracking error enable signal TE-EN maintains low in level, at the seek mode. When the number of counted tracks is less than the number of total tracks to be traversed, by one, during the continued track seek operation, in particular, when the laser beam is approached to the target track TT so that it is positioned within a range of $\pm\frac{1}{4}$ track pitches from the target track TT, the tracking error enable signal TE-EN becomes high, as shown in FIG. 2e.

Where the laser beam is positioned at the interval T2, namely, a range from $-\frac{1}{2}$ track pitch to $-\frac{1}{4}$ track pitch from the target track TT or at the interval T3, namely, a range from $+\frac{1}{4}$ track pitch to $+\frac{1}{2}$ track pitch from the target track, the sum signal SUM has a negative polarity, as shown in FIG. 2d, so that the output from the comparator 9 has a low level. In the following description, signal conditions in brackets relate to the interval T3. The low level output from the comparator 9 is inverted to high level by the inverter 11. The AND gate 15 which receives the high level output from the inverter 11 outputs a high level signal, in that the tracking error enable signal TE-EN applied thereto also has a high level. The high level output from the AND gate 15 is inverted to a low level by the inverter 20, so that the output stage C3 of switching circuit 3 maintains low in level, thereby causing the third switch S3 to be switched OFF. As a result, the tracking error signal TES can not be applied to the tracking servo circuit. At this time, the output from the comparator 8 has a low level (high level), because the polarity of tracking error signal TES is negative (positive). Then, the inverter 10 outputs a high level signal (low level signal), thereby causing the AND gate 13 to output a high level signal (low level signal). Accordingly, the NAND gate 17, which receives the tracking error enable signal TE-EN of high level (low level) and the high level (low level) output from the AND gate 13, outputs a high level signal (low level signal). As a result, the output stage C2 of switching circuit 3 corresponding to the output of the inverter 19 becomes high (low), thereby causing the switch S2 to be switched ON (OFF).

Also, the high level signal (low level signal) from the inverter 10 is applied to the NAND gate 12 which, in turn, outputs a low level signal (high level signal). Then, the AND gate 14, which receives the output from the NAND gate 12 and the output from the inverter 11, outputs a low level signal (high level signal). On the other hand, the NAND gate 16, which receives the output from the AND gate 14 and the tracking error enable signal TE-EN of high level, outputs a high level signal (low level signal ). As a result, the output stage C1 of switching circuit 3 corresponding to the output of the inverter 18 becomes low (high), thereby causing the switch S1 to be switched OFF (ON).

Where the laser beam is positioned at the interval T1 of $\pm\frac{1}{4}$ track pitches from the target track TT, the tracking error enable signal TE-EN maintains high in level, as shown in FIG. 2e. At this time, the polarity of sum signal SUM is positive, as shown in FIG. 2d. Accordingly, the output from the inverter 11 becomes low.

At this time, since the tracking error signal TES has the polarity of negative in $-\frac{1}{4}$ track pitch from the target track TT and of positive in $+\frac{1}{4}$ track pitch from the target track TT, it becomes low or high in level according to its polarity while passing through the comparator 8, the inverter 10 and the NAND gate 12. However, since the output from the inverter 11, which is applied to one input of AND gate 14, has a low level, outputs from the AND gate 14 and the NAND gate 16 become low and high in level, respectively, irrespective of the level of signal applied to the other input of AND gate 14. Accordingly, the output stage C1 of switching circuit 3 corresponding to the output of inverter 18 becomes low in level, thereby causing the first switch S1 to be switched OFF. In similar, outputs from the AND gate 13 and the NAND gate 17 become low and high in level, respectively, so that the output of inverter 19 and thus the output stage C2 of switching circuit 3 become low in level, thereby causing the second switch S2 to be switched OFF.

At the low level output condition of inverter 11, the AND gate 15 and the inverter 20 output a low level signal and a high level signal, respectively, so that a high level signal is outputted from the output stage C3 of switching circuit 3 and then applied to one input of AND gate 6' of the logic circuit 6.

In this case, the fourth and fifth switches S4 and S5 are switched OFF, because both the $-V$ on signal and the $+V$ on signal maintain low in level. These low level signals are also applied to the NOR gate 7, so that the output from the NOR gate 7 and thus the output from the AND gate 6' of logic circuit 6 become high in level, thereby enabling the third switch S3 to be switched ON.

The operations of switch circuit 3 at other intervals T4 and T5 are similar to the above-mentioned operations and thus their detailed description will be omitted.

Figure 5:
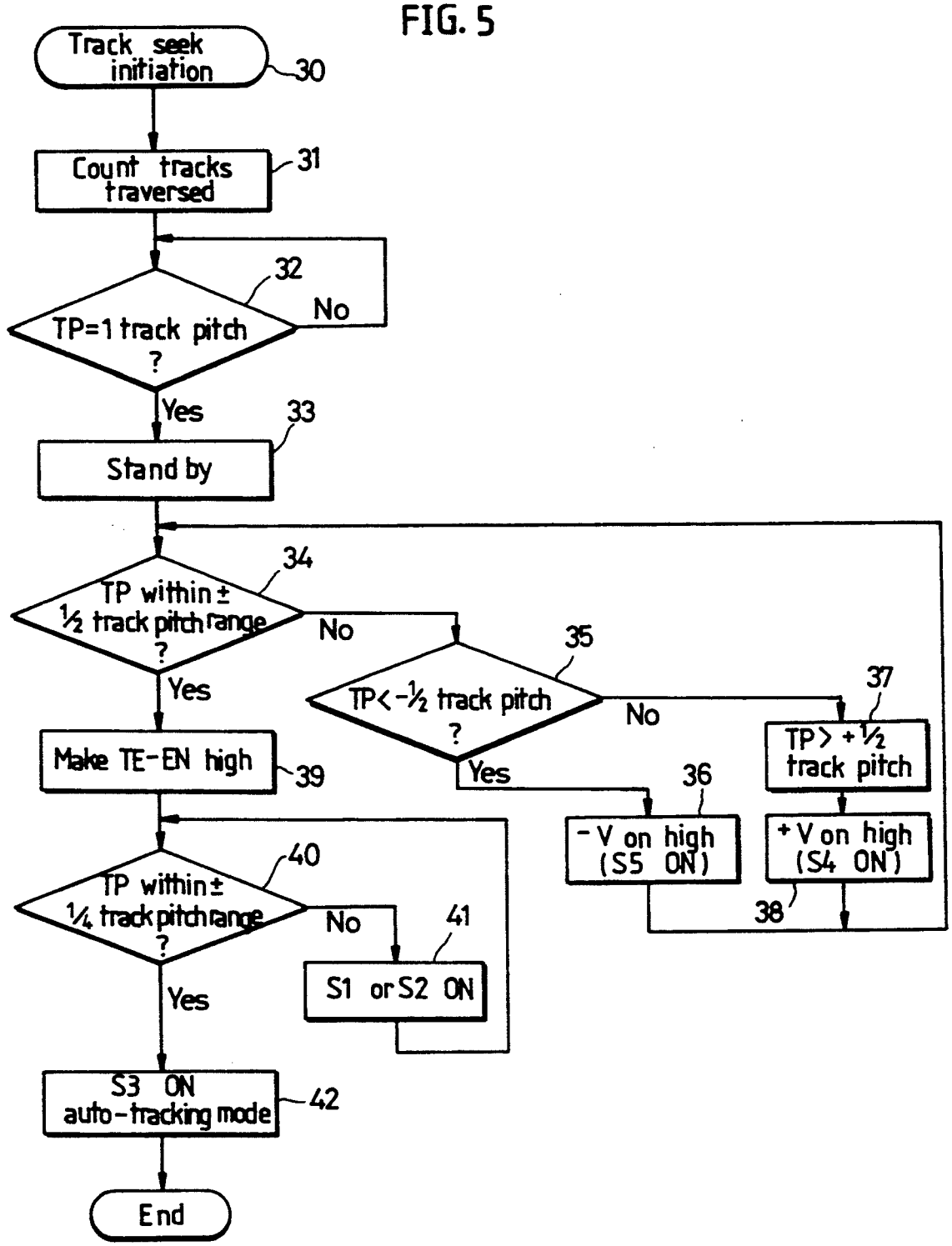
FIG. 5 is a flow chart illustrating a tracking induction method according to the present invention.

FIG. 5 is a flow chart illustrating a tracking induction method according to the present invention.

The method comprises three main steps. The first main step is to shift the laser beam up to one track pitch before the target track TT. The second main step is to determine, when the laser beam after the first main step is positioned beyond a range of $\pm\frac{1}{4}$ track pitches from the target track TT, whether the track pitch TP of the shifted laser beam from the target track TT is less than $-\frac{1}{2}$ track pitch, to shift the laser beam to the target track TT, based on the $-V$ on signal, when the track pitch TP is less than $-\frac{1}{2}$ track pitch, to shift the laser beam to the target track TT, based on the $+V$ on signal, when the track pitch TP is more than $+\frac{1}{2}$ track pitch, and to perform a subsequent step, based on the tracking error enable signal TE-EN, when the track p itch TP is within a range of $\pm\frac{1}{2}$ track pitches. Finally, the third main step is to perform an automatic tracking operation, based on the tracking error signal, when the shifted laser beam after the second main step is positioned within a range of $\pm\frac{1}{4}$ track pitches from the target track and to shift the laser beam to the target track TT, based on a signal resulting from a deduction or an addition for a positive or negative peak value of the tracking error signal TES and the sum signal SUM, when the laser beam is positioned beyond the range of $\pm\frac{1}{4}$ track pitches.

The first main step comprises the steps 30 to 33 illustrated in FIG. 5. In accordance with the first main step, as a track seek is initiated (Step 30) (at this time, the tracking error enable signal maintains low in level), the number of tracks over which the laser beam has passed is counted, by counting zero crossings of the tracking error signal TES (Step 31). By the counted value, it is then checked whether the laser beam has been shifted to one track pitch before the target track TT (Step 32). When the track pitch TP of laser beam from the target track TT does not correspond to one track pitch, further shift of the laser beam and the checking are repeated until the track pitch TP of laser beam corresponds to one track pitch. At the track pitch TP of laser beam corresponding to one track pitch, the first main step is completed after a standby of a predetermined time (Step 33). During the standby, the counting of the number of traversed tracks is continued, because the shift of laser beam is still carried out.

The second main step comprises the steps 34 to 39 illustrated in FIG. 5. In accordance with the second main step, following the step 33, it is checked whether the current position of laser beam is within a range of $\pm\frac{1}{2}$ track pitches from the target track TT, namely, within a range of intervals T1 to T3 of FIG. 2a, because the standby condition at the step 33 corresponds to the condition of no application of any signal for laser beam shift to the fine actuator (Step 34). When the laser beam position has been checked to be beyond the range of $\pm\frac{1}{2}$ track pitches from the target track TT at the step 34, it is first checked whether the track pitch TP of laser beam position from the target track is less than $-\frac{1}{2}$ track pitch (Step 35). When the track pitch TP of laser beam position from the target track is less than $-\frac{1}{2}$ track pitch, it is determined that the laser beam has been positioned at the interval T4 of FIG. 2a, namely, beyond $-\frac{1}{2}$ track pitch from the target track TT. In this case, the laser beam is shifted rightward to the target track TT by making the level of the $-V$ on signal high, as shown in FIG. 2f, even though the laser beam has been positioned beyond $-\frac{1}{2}$ track pitch from the target track TT (Step 36) (at this time, only the fifth switch S5 is switched ON). Then, the procedures following the step 34 are repeated. When the track pitch TP of laser beam position from the target track TT has been checked to be more than $-\frac{1}{2}$ track pitch, it is determined that the laser beam has been positioned at the interval T5 of FIG. 2a, namely, beyond $+\frac{1}{2}$ track pitch from the target track TT. In this case, the laser beam is shifted leftward to the target track TT by making the level of the $+V$ on signal high, as shown in FIG. 2g (Step 37) (at this time, only the fourth switch S4 is switched ON). Then, the procedures following the step 34 are repeated. On the other hand, when the laser beam position has been checked to be with in the range of $\pm\frac{1}{2}$ track pitches from the target track TT at the step 34, it is determined that the laser beam has been positioned at one of the intervals T2, T1 and T3 of FIG. 2a. In this case, the tracking error enable signal TE-EN becomes high in level, as shown in FIG. 2e. Under this condition, the second main step is performed (Step 39).

The third main step comprises the steps 40 to 42 illustrated in FIG. 5. In accordance with the third main step, it is first checked whether the current position of laser beam is within a range of $\pm\frac{1}{4}$ track pitches from the target track TT, namely, at the interval T1 of FIG. 2a (Step 40). When the laser beam position has been checked to be beyond the range of $\pm\frac{1}{4}$ track pitches from the target track at the step 40, it is determined that the laser beam has been positioned at one of the intervals T2 and T3 of FIG. 2a. In this case, the step 40 is repeated under a condition that one of the first, switch S1 and the second switch S2, which corresponds to the current interval T2 or T3, is switched ON (Step 41). On the other hand, when the laser beam position has been checked to be within the range of $\pm\frac{1}{4}$ track pitches from the target track TT at the step 40, namely, at the interval T1 of FIG. 2a, the third switch S3 is switched ON, so that the tracking error signal TES can be sent to the tracking servo circuit, for converting the current mode into the automatic tracking mode (Step 42). Then, the third main step is completed.

As apparent from the above description, the present invention makes it possible to achieve the tracking induction, irrespective of the position of laser beam and thus making the tracking induction stable. It is also possible to reduce the total time including the time taken to read information about the object target and the track jumping time taken to seek the target track, after a failure of the tracking induction. Accordingly, the data reading/writing at the target track can be more rapidly carried out.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A tracking induction system for an optical disc driver, comprising:
   peak detection means for detecting a peak value of a tracking error signal which is a position error signal from a detector of an optical disc driver for sensing a laser beam reflected by a disc;
   a gain controller for controlling the amplitude of a sum signal with a phase shift of 90° from said position error signal, to be the same as said tracking error signal;
   switching circuit means having first to third output stages and for switching a tracking error enable signal supplied from a microprocessor, the tracking error signal and the sum signal when the laser beam is approaching a target track;
   a deductor and an adder for performing a deduction and an addition for outputs from said peak detection means and said gain controller, respectively;
   logic circuit means for controlling the switching of the tracking error signal, based on $-V$ on signal and $+V$ on signal outputted orderly from said microprocessor at intervals of $\pm\frac{1}{2}$ track pitches from said target track and adapted to switch $-V$ and $+V$, and a signal from said third output stage of said switching circuit means; and
   a switching unit for selecting one from a group consisting of outputs from the deductor and adder, the tracking error signal, the $+V$ and the $-V$, at each interval, based on the tracking error signal, the sum signal, the tracking error enable signal, the $-V$ on signal and the $+V$ on signal, and thus generating an artificial tracking induction signal enabling a tracking induction at intervals of $\pm\frac{1}{2}$ track pitches or more from said target track.

2. A tracking induction system in accordance with claim 1, wherein said switching circuit means comprises:
   a first comparator for receiving said tracking error signal as its input;
   a first inverter for inverting an output signal from said first comparator;
   a first NAND gate for receiving an output signal from said first inverter as its common inputs and NANDing them;

a second comparator for receiving said sum signal as its input;

a second inverter for inverting an output signal from said second comparator;

a first AND gate for receiving an output signal from the first inverter and an output signal from said second inverter as its inputs and ANDing them;

a second AND gate for receiving an output signal from said first NAND gate and said output signal from the second inverter as its inputs and ANDing them;

a second NAND gate for receiving an output signal from said second AND gate and said tracking error enable signal as its inputs and NANDing them;

a third inverter for inverting an output signal from said second NAND gate and outputting the resultant signal as a signal for controlling ON/OFF of a first switch constituting a part of said switching unit;

a third NAND gate for receiving an output signal from said first AND gate and the tracking error enable signal as its inputs and NANDing them;

a fourth inverter for inverting an output signal from said third NAND gate and outputting the resultant signal as a signal for controlling ON/OFF of a second switch constituting a part of the switching unit;

a third AND gate for receiving the output signal from the second inverter and the tracking error enable signal and ANDing them; and a fifth inverter for inverting an output signal from said third AND gate and outputting the resultant signal as a signal for controlling ON/OFF of a third switch constituting a part of the switching unit.

3. A tracking induction system in accordance with claim 1, wherein said switching unit comprises:

a first switch for switching an output from said deductor, based on a signal from said first output stage of said switching circuit means;

a second switch for switching an output from the adder, based on a signal from said second output stage of the switching circuit means;

a third switch for switching said tracking error signal, based on an output signal from said logic circuit means;

a fourth switch for switching said $+V$, based on said $+V$ on signal; and a fifth switch for switching said $-V$, based on said $-V$ on signal, only one of said first to fifth switches being switched on at each interval.

4. A tracking induction method carried out in a tracking induction system for an optical disc driver, said tracking induction method comprising:

a first main step including the steps of counting zero-crossings of a tracking error after initiating a track seek under a condition that a tracking error enable signal maintains low in level, checking whether a laser beam has been shifted to one track pitch before a target track, based on the counted zero-crossings, repeating a further shift of the laser beam and the checking when a track pitch of the laser beam from said target track does not correspond to one track pitch, until said track pitch of the laser beam corresponds to one track pitch, and performing a standby of a predetermined time when the track pitch of the laser beam corresponds to one track pitch while keeping the counting;

a second main step including the steps of checking whether the laser beam after the first step is positioned within a range of $\pm\frac{1}{2}$ track pitches from the target track, checking whether the track pitch of the shifted laser beam is less than $-\frac{1}{2}$ track pitch when the laser beam is positioned beyond said range of $\pm\frac{1}{2}$ track pitches from the target track, shifting the laser beam rightward to the target track, based on a $-V$ on signal of high level, when the track pitch of the laser beam is less than $-\frac{1}{2}$ track pitch, returning to said step of checking whether the laser beam is positioned within the range of $\pm\frac{1}{2}$ track pitches from the target track, shifting the laser beam leftward to the target track, based on a $+V$ on signal of high level, when the track pitch of the laser beam is more than $+\frac{1}{2}$ track pitch, returning to said step of checking whether the laser beam is positioned within the range of $\pm\frac{1}{2}$ track pitches from the target track, and performing a shift of the laser beam to the target track, based on said tracking error enable signal of high level, when the track pitch of the laser beam is with in the range of $\pm\frac{1}{2}$ track pitches from the target track; and a third main step including the steps of checking whether the shifted laser beam after said second main step is positioned within a range of $\pm\frac{1}{4}$ track pitches from the target track, shifting the laser beam to said range of $\pm\frac{1}{4}$ track pitches from the target track under condition that a selected one of first and second switches is at its ON state, when the laser beam is positioned beyond the range of $\pm\frac{1}{4}$ track pitches from the target track, returning to said step of checking whether the laser beam is positioned within the range of $\pm\frac{1}{4}$ track pitches from the target track, and sending a tracking error signal to a tracking servo circuit and thus performing an automatic tracking operation, when the laser beam is positioned within the range of $\pm\frac{1}{4}$ track pitches from the target track.

* * * * *